Figure 1:
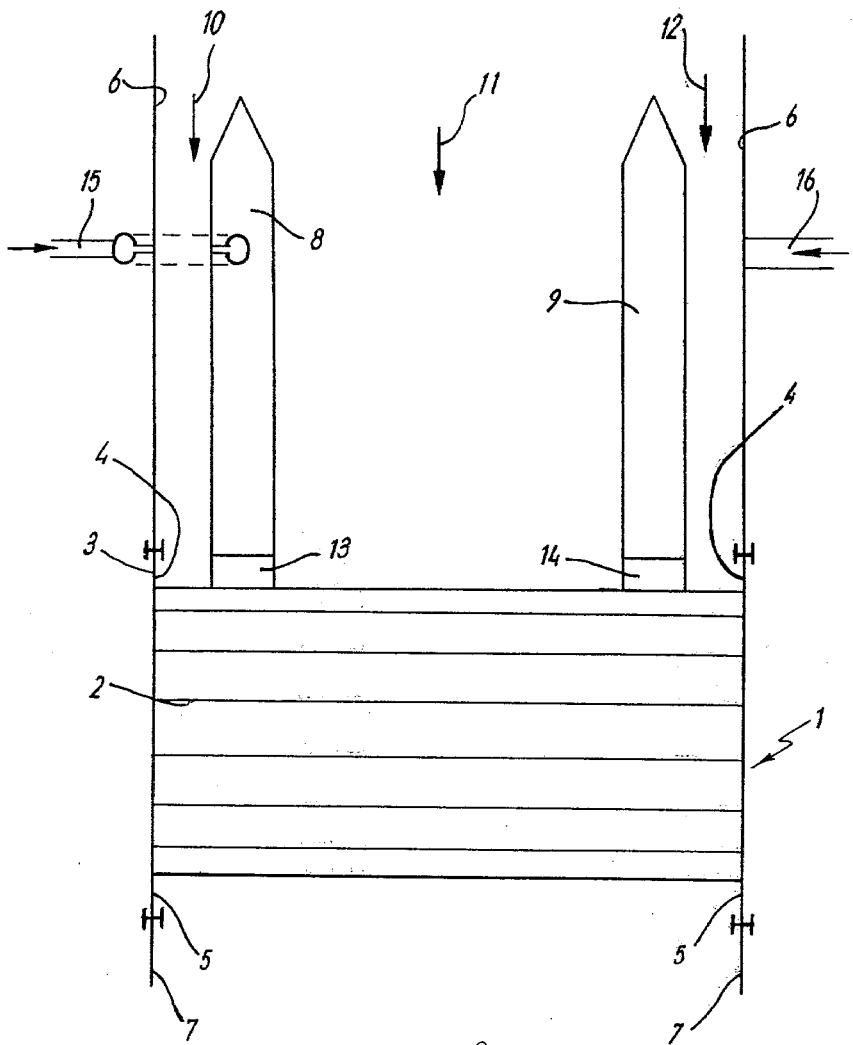

United States Patent [19]

Hill

[11] 4,338,274

[45] Jul. 6, 1982

[54] METHOD AND APPARATUS FOR THE INCORPORATION OF ADDITIVES INTO PLASTICS MATERIALS

[75] Inventor: Alan H. Hill, Bury, England

[73] Assignee: General Engineering Radcliffe 1979 Limited, Radcliffe, England

[21] Appl. No.: 195,766

[22] Filed: Oct. 10, 1980

[30] Foreign Application Priority Data

Oct. 12, 1979 [GB] United Kingdom ............... 7935441

[51] Int. Cl.³ .............................................. B29F 3/12
[52] U.S. Cl. ...................................... 264/171; 264/211; 264/245; 264/349; 366/76; 366/272; 418/15; 418/206; 425/131.1; 425/376 B
[58] Field of Search ............... 264/171, 245, 349, 78, 264/211, 75; 425/204, 376 R, 205, 208, 376 B, 131.1; 366/272, 76; 418/15, 206

[56] References Cited

U.S. PATENT DOCUMENTS

| | | | |
|---|---|---|---|
| 1,923,268 | 8/1933 | Jensen | 418/206 |
| 3,291,060 | 12/1966 | Bottoms | 418/15 |
| 3,420,180 | 1/1969 | Behrends et al. | 418/15 |
| 3,680,990 | 8/1972 | Pettibone et al. | 418/206 |
| 3,740,025 | 6/1973 | Ruf | 366/76 |
| 3,764,238 | 10/1973 | Carpigiani | 418/15 |
| 3,930,782 | 1/1976 | Bigland | 425/376 R |
| 4,015,828 | 4/1977 | Miles | 264/349 |
| 4,025,056 | 5/1977 | Miles et al. | 366/272 |
| 4,182,601 | 1/1980 | Hill | 425/376 R |

FOREIGN PATENT DOCUMENTS 2844753 5/1979 Fed. Rep. of Germany ...... 264/211

*Primary Examiner*—Jeffery R. Thurlow
*Attorney, Agent, or Firm*—Fleit & Jacobson

[57] ABSTRACT

A stream of homogenized plastics material is divided into stream parts 10, 11 and 12 and additive introduced to the external surface of at least one stream part 10, 12 either at or before a gear pump 1. Subsequent passage through the pump 1 mixes the additive in before the stream parts 10, 11 and 12 are recombined downstream of the pump. Stream parts 10, 11 and 12 may be separated by partition on approach to the pump gear and also by partitions 8 and 9 in the pump 1 itself.

15 Claims, 4 Drawing Figures

METHOD AND APPARATUS FOR THE INCORPORATION OF ADDITIVES INTO PLASTICS MATERIALS

This invention concerns a method and apparatus for the incorporation of an additive (or additives) into a stream of homogenised plastics material. More particularly the invention concerns the incorporation of a colourant into the plastics material for the purpose, for example, of producing a colour coded extruded plastics material coating on an electrical conductor.

We have described in our co-pending British Patent application No. 20382/78 a method and apparatus for injecting an additive, primarily a colourant, into a boundary layer of a stream of homogenised plastics material with a view to producing a finally masticated material which can be extruded to provide a striped or surface coloured plastics material coating on an electrical conductor.

In the application referred to above a pre-requisite of the apparatus is the provision of an injector which has its open end protruding into the stream of plastics material so that the injector serves to produce a division in the plastics material into which the additive can be injected. The apparatus of the above mentioned application includes a gear pump for the final mastication of the plastics material and additive. When using the apparatus and method disclosed in the aforesaid application the additive is largely confined to a pre-selected region or regions of the plastics material. To achieve the dispersion largely in pre-selected regions only of the plastics material it is necessary to arrange for that part or those parts of the stream of plastics into which the additive has been introduced to pass through the gear pump in the region of the end or ends of the teeth of the intermeshing gears.

While the apparatus and method briefly referred to above enables the requisite dispersion of additive to be achieved, difficulties are experienced in some instances. For example, there is a tendency for plastics material to enter the additive injector and under some circumstances to cause a blockage of the injector.

An object of the present invention is to provide an apparatus for the incorporation of an additive into a pre-selected region or regions of a stream of plastics material. A further object of the present invention is to provide a method of incorporating an additive into a stream of plastics material to ensure that it remains largely in a pre-selected region or regions thereof.

Thus according to one aspect of the present invention the method of incorporating an additive into a stream of homogenised plastics material in a predetermined location or locations and thereafter confining the additive substantially to that location or those locations includes the steps of feeding a homogenised plastics material towards a gear pump, dividing the stream into at least two parts and maintaining the division at least until the plastics material enters the teeth of the gear pump, introducing an additive into the plastics material before or at the gear pump and in such a manner that the additive passes through an end region or the end regions of the gears of the gear pump and thereafter re-combining the parts of the stream prior to extrusion through a die to produce a product with at least one localised longitudinally extending modified plastics material region therein.

In one arrangement the divided stream of plastics material has its parts physically separated during passage through the gear pump.

A convenient method includes the steps of dividing the stream into two equal parts, feeding the parts each to one gear of the gear pump at a position after the point of separation of the gears and in such manner that the plastics material first enters the spaces between the teeth in the central region thereof, feeding the additive to at least one end region of the teeth at the point of separation of the teeth and substantially confining the additive to the end region of the teeth to which it was fed to cause mixing of the additive with the plastics material substantially only at the end or ends of the teeth, and feeding the locally modified plastics stream to an extruder die head to produce a product with at least one localised longitudinally extending modified plastics material region therein.

According to a further aspect of the present invention an apparatus for carrying out the method aforesaid includes a plastics material supply pipe to a gear pump there being at least one division in the pipe to divide it into separate parts, and means for supplying additive to at least one of those parts such that the additive supplied contacts and flows along the external surface of the part.

In one arrangement the or each division of the supply pipe is effectively extended into the gear pump by providing a barrier or barriers therein separating the gears into section.

Conveniently the apparatus is provided with an outlet pipe from the gear pump, which pipe is divided to correspond to the division or divisions of the supply pipe.

In an alternative apparatus the pipe is divided into two parts in such manner that, in use, plastics material is fed to the gear pump such that one stream is fed to each gear to enter the spaces between the teeth after the point of separation thereof, there being means for feeding additive to the spaces between the teeth at the point of separation of the gears and into at least one end region of the gears thereby, in use, to be mixed with plastics material substantially at an end region or the end regions only of the gears.

Figure 2:
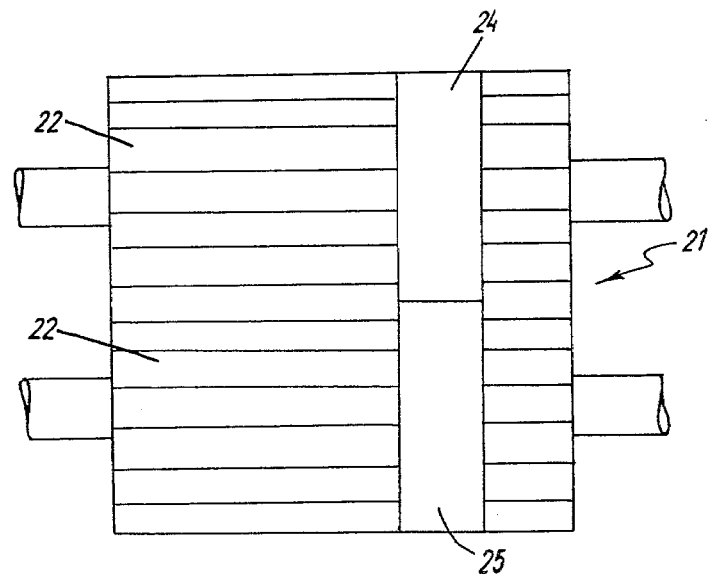
Figure 3A:
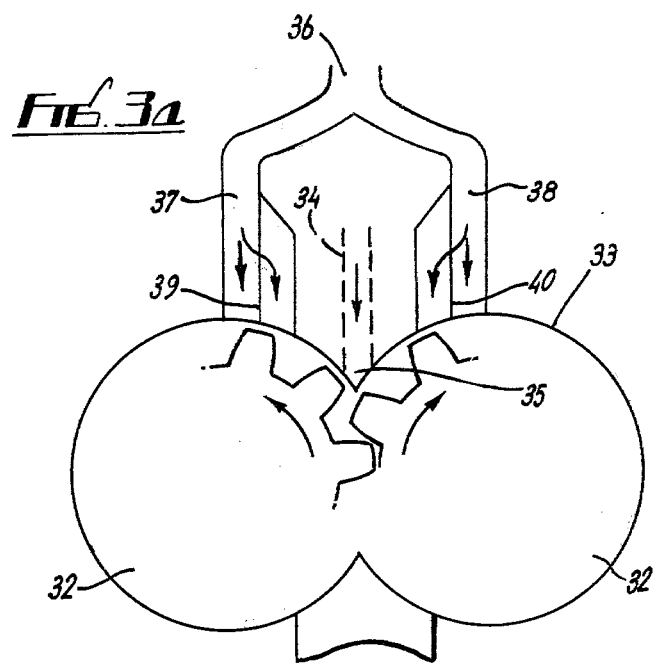
Figure 3B:
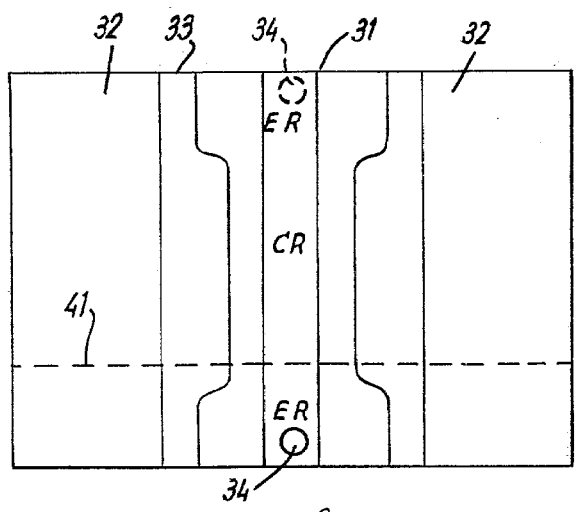

In order that the invention may be more clearly understood, several embodiments thereof will now be described, by way of example, with reference to the accompanying drawings, in which:

FIG. 1 diagrammatically shows in plan view one form of apparatus for incorporating an additive into a stream of homogenised plastics material, FIG. 2 diagrammatically shows an end elevational view of an alternative form of the apparatus shown in FIG. 1, FIG. 3a diagrammatically shows an elevational view in section of a further form of apparatus for incorporating an additive into a stream of homogenised plastics material, and FIG. 3b is a sectional plan view of the apparatus shown in FIG. 3a.

Since gear pumps are known, per se, no detailed description of their construction is thought to be necessary for a complete understanding of this invention.

Referring to FIG. 1, the apparatus for incorporating an additive into a stream of homogenised plastics material comprises a gear pump 1 which is of standard form and includes two superposed intermeshing gears 2 (only the upper one of which is visible), disposed in a gear housing 3. Entry and exit ports 4 and 5 to the gear housing 3 are, disposed at the sides of the housing 3. The plastics material therefor enters the pump 1 across the full width of the gear teeth and directly into the region of the gears in which they mesh.

This pump is provided with entry and exit conduits 6 and 7 for the plastics material and these are secured to the pump housing at the entry and exit ports 4 and 5 respectively. The conduit 6 secured to the housing 3 at the pump entry port 4 is provided with dividing walls 8 and 9 which serve to divide the conduit 6 into three sections in such manner that, across the width of the gears 2 of the pump 1 when the apparatus is in use, plastics material will be delivered in three stream parts 10, 11 and 12, there being a relatively narrow stream parts 10 and 12 adjacent each end of the gears 2 and a broad central stream part 11.

To ensure that these stream parts 10, 11 and 12 are fed into the gears 2 in individual streams the pump housing entry port is provided with corresponding dividing walls 13 and 14 which align with the conduit divisions 8 and 9.

The entry conduit 6 is formed with additive entry apertures 15 and 16 so positioned that additive can be pumped into the parts of the conduit which feed the narrow streams 10 and 12 of plastics material to the axial ends of the gears 2.

In operation, assuming that the plastics material which is eventually to be extruded onto an electrical conductor wire, is to be white (or near white) with two green stripes thereon, homogenised plastics material is fed to the gear pump entry conduit 6 and is divided into three stream parts 10, 11 and 12. Green colourant, in liquid form, is pumped to the additive entry apertures 15 and 16 in the conduit and flows with the narrow stream parts 10 and 12 to the teeth of the gear pump gears 2. It is to be expected that the colourant will, generally speaking, tend to flow around the plastics material at and near the entry aperture 15, 16 since it will spread from the aperture 15, 16 between the plastics material and the walls of the conduit 6 which define the narrow entry passage 6 to the pump gears 2.

The colourant is thus physically confined to two well defined narrow bands which enter the gears 2 of the pump 1 and in its passage through the pump 1 the colourant becomes well mixed with the plastics material which flowed along the small passages of the entry conduit 6. During passage through the pump the three stream parts 10, 11 and 12 of plastics material recombine but, apart from slight migration the colourant mixes only with the plastics material which flowed down the small passages. The plastics material leaving the pump therefore has two well defined regions (or stripes) of coloured plastics material on its surface and these stripes appear equally as well defined in the extruded insulating layer which is formed around the electrical conductor as it, and the plastics material passes through the extruder die head.

This embodiment of the invention can be modified in that, if desired, only one division is provided in the entry conduit 6. It is also possible to provide a physical division or divisions which extend through the gear chamber of the gear pump 1 so that the stream parts of plastics material do not recombine until they actually reach the gear pump outlet port 5, or outlet conduit 7. In this case, of course, migration of additive from one stream to another as the plastics material passes through the pump is completely prevented.

Such an arrangement is diagrammatically illustrated in FIG. 2. Referring to FIG. 2, two gears 22 of a gear pump 21 are superposed in intermeshing relationship. A physical division extending through the gear pump chamber is shown. This division comprises two plates 24, 25 associated with respective gears 22. In other respects the apparatus is the same as that described with reference to FIG. 1.

In the forms of the apparatus of the invention described above the additive is fed to the plastics material prior to entry into the pump gear chamber. In an alternative form of apparatus the arrangement is such that the additive is fed directly to the gear chamber of the pump. One such embodiment in this form of the apparatus of the invention is shown in FIGS. 3a and 3b in which there is provided, in the gear pump housing 33, one additive supply passage 34. The additive supply passage 34 opens into the gear chamber of the pump 31 at the point at which, in use, the pump gears 32 are just separated. The passage outlet 35 is also located adjacent one end of the gear chamber so that additive, when supplied, will be located at one axial end of the teeth of the gears 32.

The plastics material inlet 36 is of such form that the single stream of plastics material entering the pump inlet is divided into two stream parts. To achieve this two plastics feed passages 37 and 38 are formed in the pump housing 33. One feed passage 37 opens into the gear housing to feed, in use, plastics material to one gear 32 downstream (that is in relation to the point at which the gears 32 separate as they rotate) of the additive inlet 35 and the other passage 38 opens into the gear housing 33 to feed plastics to the other gear 37, also downstream of the additive inlet 35. The outlet openings 39, 40 of respective plastics material feed passages 37, 38 are formed such that, in use, plastics material enters the space between the gear teeth in the central region CR of the teeth just prior to entering at the end regions ER, thereby to ensure that the additive (which again will be assumed to be green colourant) is confined to the end region of the teeth of the gears 32. When the plastics material and additive is pumped out from the gears 32 the additive is mixed with the plastics material substantially wholly in a confined region to produce a clearly discernible green stripe which is equally clearly discernible when the plastics material has been extruded from a die head.

This form of apparatus can be modified. For example, there may be two additive supply passages 34, one located adjacent each end of the gear teeth so that two stripes can be produced. In an alternative construction there may be provided a barrier across the gear housing to divide the gear chamber into two parts. In such an arrangement migration of additive from an end region of the gears is completely prevented. Such a barrier is also shown in dotted line at 41 in FIG. 3b.

In all forms of the apparatus referred to above it is convenient to provide as many divisions in the outlet pipe as there are coloured streams issuing from the gear pump. This enables a more precise, and if required, complex distribution of the coloured material to be achieved in the extruded product.

What is claimed is:

1. A method of incorporating an additive into a stream of homogenised plastics material in a predetermined location or locations and thereafter confining the additive substantially to that location or those locations including the steps of feeding a homogenised plastics material towards a gear pump, dividing the stream into at least two parts and maintaining the division at least until the plastics material enters the teeth of the gear pump, introducing an additive into the plastics material before or at the gear pump and in such a manner that the additive passes through an end region or the end regions of the gears of the gear pump and thereafter re-combining the parts of the stream prior to extrusion through a die to produce a product with at least one localised longitudinally extending modified plastics material region therein.

2. A method as claimed in claim 1, in which the parts of the stream of plastics material are physically separated during their passage through the pump.

3. A method as claimed in claim 1, in which the stream of plastics material is divided into three parts.

4. A method as claimed in claim 3, in which the three parts comprise a central stream part and two outer stream parts running alongside on opposite sides respectively of the central stream part, the central stream parts being of greater width than the outer stream part.

5. A method as claimed in claim 1, in which the stream of plastics material is divided into two parts.

6. A method as claimed in claim 5, in which the two stream parts are of unequal width.

7. A method as claimed in claim 5, in which the two stream parts are of equal width.

8. A method as claimed in claim 1, including the step of dividing the incoming stream of plastics material into two equal stream parts and feeding the stream parts to respective gears of the gear pump at respective positions after the point of separation of the gears and in such manner that the plastics material first enters the spaces between the teeth in the central region thereof, feeding the additive to at least one end region of the teeth at the point of separation of the teeth and substantially confining the additive to the end region of the teeth to which it was fed to cause mixing of the additive with the plastics material substantially only at the end or ends of the teeth, and feeding the locally modified plastics stream to an extruder die head to produce a product with at least one localised longitudinally extending modified plastics material region therein.

9. Apparatus for incorporating an additive into a stream of homogenised plastics material in a predetermined location or locations comprising a gear pump, a plastics material supply to the gear pump, formed so as to divide an incoming stream of plastics material into at least two stream parts and means for supplying additive to at least one of those parts such that the additive supplied contacts and flows along the external surface of the part.

10. Apparatus as claimed in claim 9 in which means are provided for physically separating the stream parts during their passage through the pump.

11. Apparatus as claimed in claim 9, in which the plastics material supply comprises a conduit incorporating partition means for dividing the stream of plastics material into at least two parts.

12. Apparatus as claimed in claim 11, in which the partition means comprises two dividing walls spaced to divide the incoming stream in a central stream part and two outer stream parts of lesser width than the central stream part.

13. Apparatus as claimed in claim 11, in which the partition means is formed to divide the incoming stream into two parts of unequal width.

14. Apparatus as claimed in claim 11, in which the partition means is formed to divide the incoming stream into two parts of equal width.

15. Apparatus as claimed in claim 9, in which the plastics material supplied is formed to divide the incoming plastics material into two streams which are directed to respective gears of the gear pump to enter the spaces between the teeth of the corresponding gear after the point of separation of the gears and means are provided for feeding additive to the spaces between the teeth at the point of separation of the gears and into at least one end region of the gears thereby, in use, to be mixed with plastics material substantially at an end region or the end regions only of the gears.

* * * * *